March 17, 1970  J. H. KLUCK  3,501,692
APPARATUS FOR DETERMINING THE MOISTURE
CONTENT OF SOLIDS AND LIQUIDS
Filed Aug. 17, 1966  3 Sheets-Sheet 1
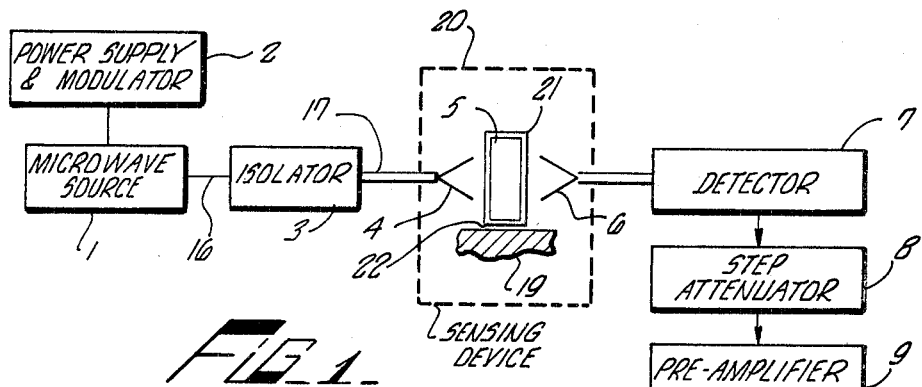
FIG_1_
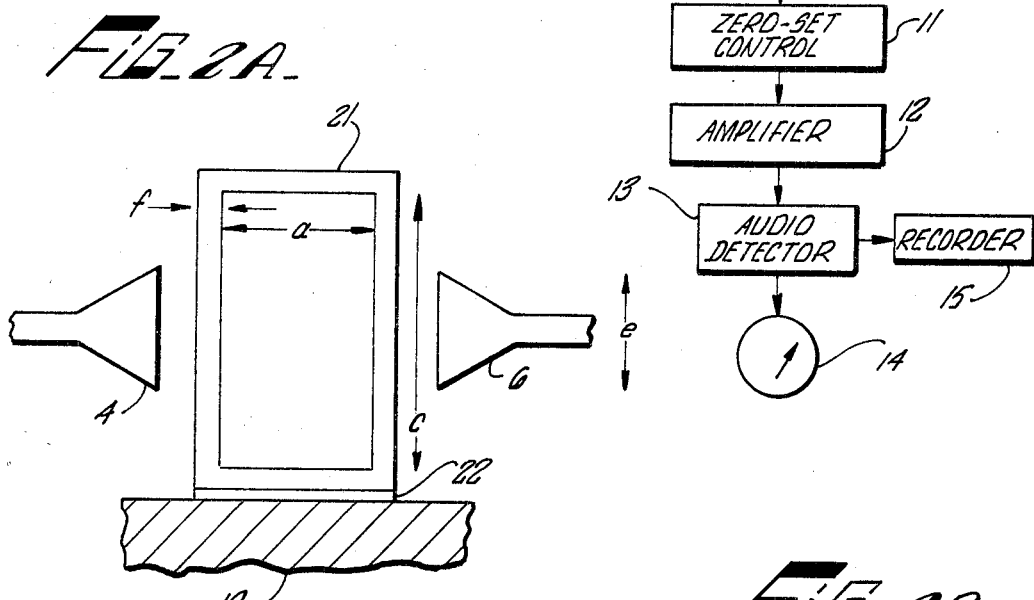
FIG_2A_
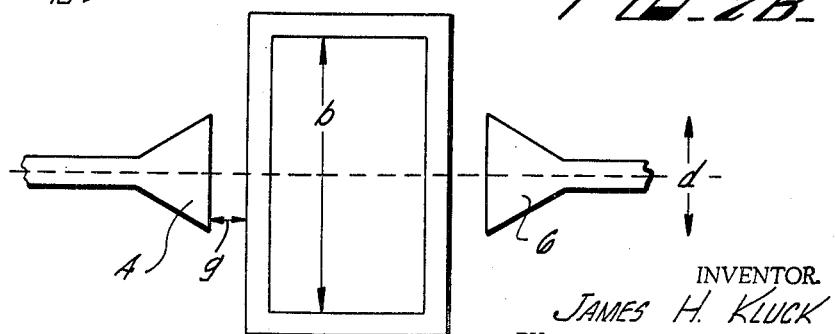
FIG_2B_
INVENTOR.
JAMES H. KLUCK
BY Christie, Parker + Hale
ATTORNEYS.

March 17, 1970  J. H. KLUCK  3,501,692
APPARATUS FOR DETERMINING THE MOISTURE
CONTENT OF SOLIDS AND LIQUIDS
Filed Aug. 17, 1966  3 Sheets-Sheet 2

INVENTOR.
JAMES H. KLUCK
BY
Christie, Parker & Hale
ATTORNEYS.

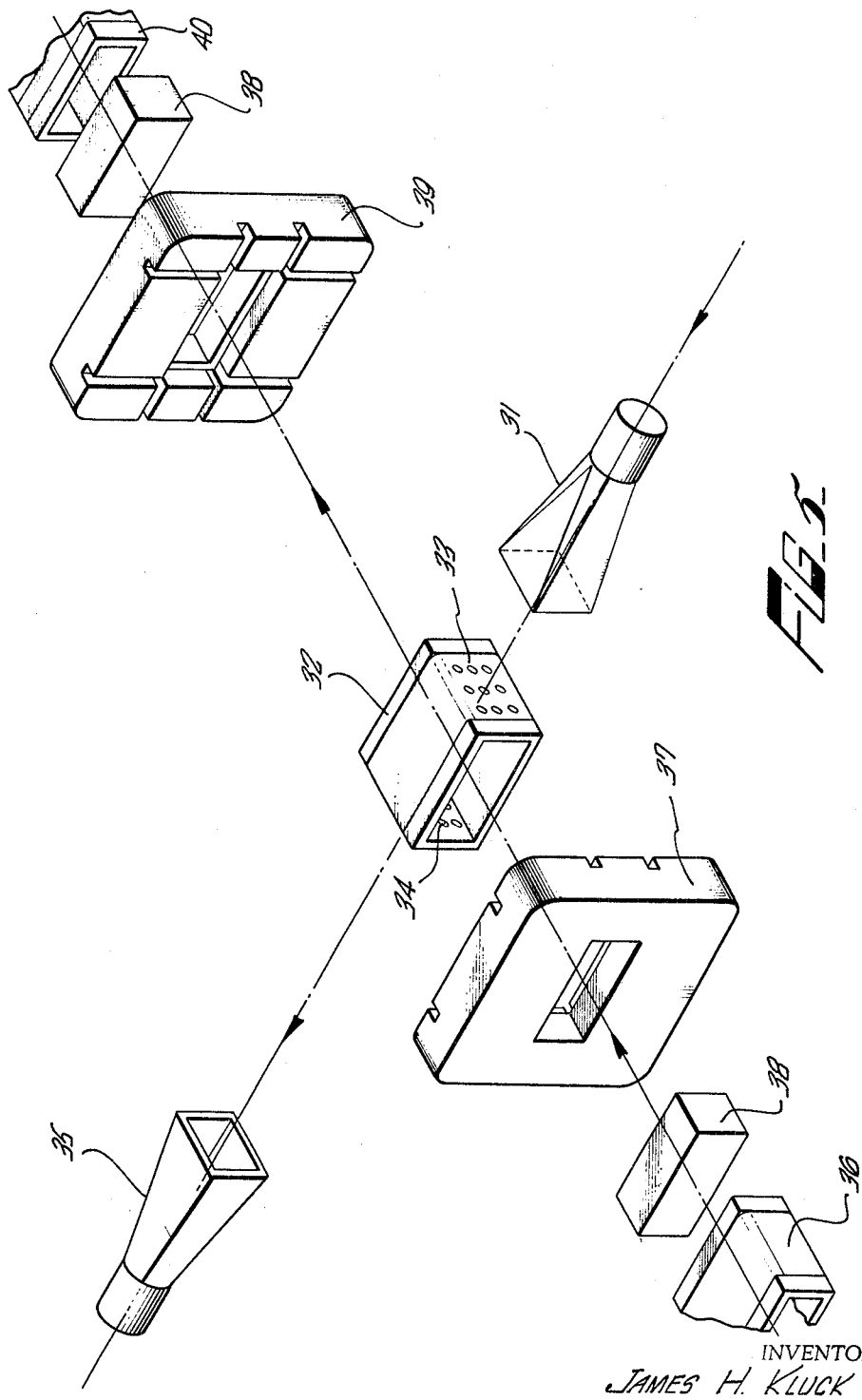

United States Patent Office 3,501,692
Patented Mar. 17, 1970

3,501,692
APPARATUS FOR DETERMINING THE MOISTURE CONTENT OF SOLIDS AND LIQUIDS
James H. Kluck, Altadena, Calif., assignor to Hammtronics Systems, Inc., Pasadena, Calif., a corporation of Delaware
Filed Aug. 17, 1966, Ser. No. 573,053
Int. Cl. G01r 27/04
U.S. Cl. 324—58.5                                 4 Claims

ABSTRACT OF THE DISCLOSURE

Electromagnetic apparatus for providing a direct indication of the moisture content of materials stored in a container adapted to transmit electromagnetic energy therethrough. A narrow beam of electromagnetic energy is generated for transmission through the material undergoing measurement and is received after travelling therethrough. The receiving apparatus includes precision elements making up an audio substitution means for accurately measuring changes in the level of the electromagnetic signal before and after the material is placed in the container. These elements include step attenuators that are switched into and out of the circuit to allow the amplifiers following the attenuators to operate at a constant signal level.

---

This invention relates to a method and apparatus for measuring the moisture content of both solids and liquids, including "packaged" solids, and providing a direct and continuous reading of the moisture content of either the solid or liquid being measured.

The determination of water in solids and liquids has always been important in both the laboratory and industrial plant. Direct determinations of moisture content are usually made by driving off the water from the solution and either measuring the amount of water removed or measuring the weight of the sample after the removal of water and then calculating the original percentage of water in the material. These methods are time-consuming, generally requiring an hour or more for each determination. They also result in destruction or at least a change in composition of the sample which is often undesirable since it is then impossible to check the results by another moisture determination method. Most of these methods are also limited to analysis of very small samples for practical reasons and the resulting determinations may not give a result typical of the larger body of material from which the sample was taken because of localized moisture content pockets. The direct determination methods also are not suitable for continuous monitoring of moisture content of a material as it is being processed since they require the utilization of a discrete sample. Furthermore, the direct methods such as the Karl Fischer titration process requires considerable skill and specialized knowledge on the part of the operator and hence are awkward for general usage in areas where this talent is not generally available. Furthermore, it has been shown that even the direct air drying methods of measuring moisture content are subject to significant errors.

In direct methods of measuring moisture content make use of other properties of the material which in turn are related to moisture content. The most commonly used methods are electrical in nature and are described as conductance type or capacitance type methods. In the conductance type a voltage is impressed across the sample and its conductivity is measured by well known methods. A relationship between moisture content and conductivity is derived by experiment and then used for absolute determinations. In the capacitance type the material under test is used as the dielectric between two capacitor plates. A change in moisture content changes the capacity of an associated circuit and change in capacity in electrically measured. A relationship between moisture content and capacity is derived experimentally and is then used for absolute determinations. The use of this conductivity method is roughly limited to a moisture content falling between the values of 7% and 23%. This is due to the lack of a significant change in conductivity outside of this region. Furthermore, the method may have a considerable error if the moisture is not uniformly distributed within the pieces of material being tested since it is primarily responsive to surface conditions. The capacitance method is generally accepted as being more accurate and useful over a wider range of moisture contents than the conductivity method. However, in this method the material must make good and uniform contact with the electrodes forming the capacitor plates otherwise errors will result. Neither the capacitance or conductance type methods are suitable for continuous on-stream measurements since they require intimate contact with the material being measured which is impossible or undersirable in most applications.

British patent specification 897,956 discloses a method of measuring the moisture content of porous or semi-porous bodies or material of low or zero electrical conductivity through the use of electromagnetic energy, without contacting the material. Specifically, the material undergoing measurement is subjected to electromagnetic energy to cause the energy to be transmitted therethrough and to be received after attenuation by the material. The attenuation of the electromagnetic energy introduced by the material is a determination of the moisture content of the material when related to a previously prepared chart relating attenuation to moisture content. No direct reading of moisture content is disclosed in this British specification.

The method and apparatus of the present invention provides a means of accurately, quickly and directly determining the moisture content of both solids and liquids including those which are in a packaged form. The method is applicable to fixed moisture content samples of material, continuous monitoring of a fixed material while undergoing a moisture content change, or continuous on-stream monitoring of a material which may be on a conveyor belt, for example, or in a pipe line in the case of fluids. Furthermore, the method and apparatus described here provides a very rapid determination generally requiring only one minute for a complete test. In the case of an on-stream measurement essentially instantaneous response may be achieved.

The method of the present invention includes the steps of providing a sensing container of preselected electrical characteristics for holding a material to be tested and subjecting the empty container to electromagnetic energy of a preselected frequency to determine any attenuation introduced by the container. The material undergoing measurement may then be introduced into the container and the container once again subjected to the electromagnetic energy. The received, attenuated electromagnetic energy is coupled to directly indicate the moisture content of the material undergoing measurement.

From an apparatus standpoint, the present invention provides a means for directly determining the moisture content of a material undergoing measurement. The apparatus comprehends means for generating electromagnetic energy of a preselected frequency, the electromagnetic energy being modulated at a low frequency. The apparatus further includes means for transmitting the generated energy through a material undergoing measurement in a narrow beam. The material undergoing measurement may be stored or contained in a device having preselected electrical properties. The apparatus includes means arranged on the opposite side of the material undergoing measurement to receive the energy transmitted therethrough. The receiving apparatus includes apparatus for compensating for the attenuation of the transmitted energy through the material container. Indicating means calibrated for directly indicating the moisture content of the material undergoing measurement is coupled to the receiving means for responding to the moisture content signal provided thereby. The indicating means provides a continuous indication of moisture content.

The above and other features and advantages of the invention will be understood more fully and clearly upon consideration of the following specification and drawing in which:

FIG. 1 is a block diagram showing the moisture meter embodying the present invention;

FIGS. 2a and 2b are enlarged views showing the relationship of the sensing device and the container for the substance being analyzed of the moisture meter of FIG. 1;

FIG. 5 is an exploded, isometric view of a container for holding liquid under test in the moisture meter in accordance with the present invention;

Figure 3:
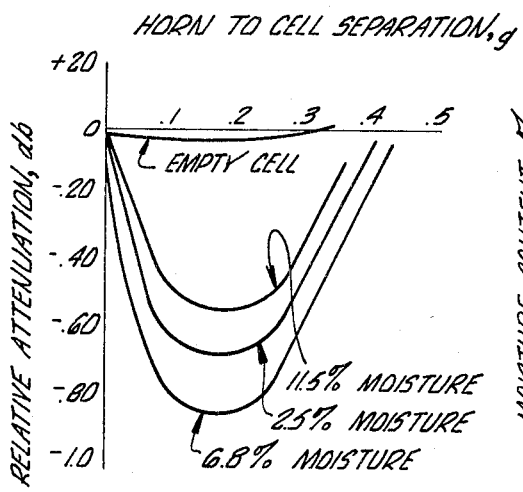
FIG. 3 is a graphical representation of relative attenuation v. horn to cell separation for samples of different moisture content.
Figure 4:
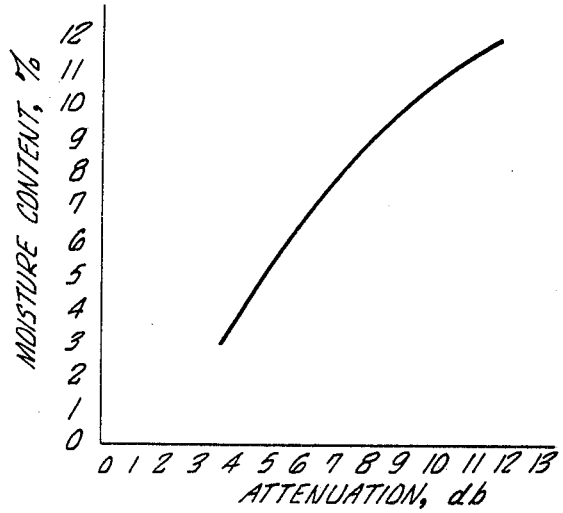
FIG. 4 is a graphical representation of percentage of moisture content v. attenuation for a rice sample of known moisture content.

The method of the present invention takes advantage of the high absorption properties of water in the microwave region of the frequency spectrum. At room temperature this absorption approaches a maximum value of about 80 db per inch at 10,000 megacycles and is approximately linearly related to moisture content. Thus the presence of water in a low loss base material can be accurately detected and measured. This loss mechanism is a function of both the dielectric constant and its conductivity and, hence, is less affected by the distributions of moisture within the particles of the material than low frequency conductivity types. In addition, operation in the microwave region allows a signal to be passed through the material in the form of a focused beam so that it is unnecessary for the material being tested to be in contact with any of the testing equipment and thereby enables the method to be used for monitoring the moisture content of a moving material, such as a material on a conveyor. This offers further advantages in the measurement of corrosive materials or materials which are sensitive to contamination such as those commonly encountered in the chemical and medical fields.

Operation in the microwave frequency region where water is highly absorptive also provides maximum sensitivity to changes in moisture content and allows useful measurements to be made over a range of moisture contents from a few parts per million to almost 100%. The apparatus is capable of utilizing a sample which is large enough so that it can accurately represent the moisture content of a much greater volume of material from which it is taken so it overcomes the disadvantage of many conventional methods which use 20 grams or less and thus may not be representative samples.

In the moisture meter of the present invention, the nearly linear relationship between the attenuation of a microwave signal and the moisture content of the substance through which the microwave signal is passed is employed. In using this phenomenon, the apparatus employed provides a means for direct reading of the moisture content of the substance. The attenuation of a microwave signal by a substance is more accurately dependent upon the compound water molecules that are present in the substance rather than the moisture content of the substance. Because of this fact, the moisture meter of the present invention is advantageously applicable to the determination of the degree of thaw of frozen products and is, therefore, very useful in the frozen food industry.

Now referring to FIG. 1, wherein the apparatus of the present invention is diagrammatically shown including a microwave signal generated by a microwave source 1 which is modulated by a modulator 2. In combination with the modulator 2 there is provided a power supply for supplying the energy for the modulator source and modulator. The output of the microwave source 1 is coupled through an isolator 3 to a horn antenna 4. The horn antenna 4 directs the microwave energy through the substance under test 5 which is positioned between the transmitting horn 4 and a receiving horn 6. The energy received by the receiving horn 6 is coupled to a detector 7 which may be, for example, the well-known square law detector employed in the microwave art. The output of the detector 7 is coupled to a precision variable step attenuator 8 and from there through a pre-amplifier 9 to another precision variable step attenuator 10. The output of this attenuator is coupled through a zero adjust control 11 to the amplifier 12. The output of the amplifier 12 is then coupled to the audio detector 13 from which the output is coupled to a direct reading meter 14 and a recorder 15.

A microwave signal is generated by the microwave source 1 when it is connected to the power supply and modulator 2. The modulator portion of the power supply supplies a modulation voltage at an audio frequency to the microwave source causing its output to be amplitude modulated at the modulator's audio frequency. The output of the microwave source is, therefore, a microwave signal which is modulated at the audio rate and is transmitted through a waveguide 16 to isolator 3. The isolator 3 is placed in the waveguide line immediately following the microwave source so that the source is protected from reflected energy which may cause a change in the amplitude and frequency of its output energy and, hence, deteriorate the measurement accuracy. From the isolator 3 the microwave energy passes through waveguide 17 into the horn antenna 4 which provides a focussing action to direct a beam of microwave energy through the substance 5 whose moisture content or presence of compound water molecules is to be determined. The microwave beam after passage through the substance 5 is received in the receiving horn antenna 6 and passes through waveguide 18 into the detector 7. The microwave detector 7 removes the signal variations which occur at the microwave frequency and provides a voltage output which varies in amplitude at the audio frequency set by the power supply and modulator 2. The voltage level at the output of the detector 7 is proportional to the microwave power input to the detector.

The substance or material 5 whose moisture content is to be determined is generally shown as positioned between the two antennas 4 and 6 on a support 19. The substance 5 may be a solid (without a container) or it may be a liquid that requires a container. The containers for the material will be described in detail hereinafter.

The microwave energy that passes through the material 5 after being detected by the detector 7 is coupled to the precision variable step attenuator 8, pre-amplifier 9, attenuator 10, zero set control 11 and amplifier 12 to the output of the system. The precision attenuator 8, pre-amplifier 9, precision attenuator 10 and zero set control 11 make up an audio substitution means of accurately measuring changes in level of the microwave signal before and after the substance 5 is inserted in the microwave signal path. In the substitution method of measuring signal level changes, accurately known attenuation steps are switched in or out of the circuit so that the signal level at the output to meter 14 or recorder 15 is returned to its original level. The change in signal level is then equal to the attenuation which has been switched in or out. The advantage of this method is that it allows the amplifier 12 and the other circuitry following the attenuators to operate at a constant signal level, thereby avoiding errors due to gain versus amplitude characteristics of the amplifier. Precision resistors are used in the step attenuator circuit to give high accuracy.

The first precision variable step attenuator 8 located immediately following the detector 7 is used for materials having low attenuation where the signal level at the input to the amplifier 12 is several orders of magnitude greater than the pre-amplifier 9 noise level. This pre-amplifier 9 is designed for low noise operation. The second precision variable step attenuator 10 is used for materials having high attenuation where it is desirable to amplify the signal before attenuating it in order to preserve a good signal to noise ratio.

The zero set control 11 is used to initially set the signal level at the input to the amplifier 12 and audio detector 13 so that the meter 14 and recorder 15 are set to a known reference level before the material to be measured is placed betwen the antennas 4 and 6. The amplifier 12 raises the signal level to a convenient value for indicating on a conventional milliammeter and recorder. The audio detector 13 converts the audio signal to direct-current so that it can be displayed on a direct-current meter 14 or a direct-current recorder 15.

When used to continuously monitor a product, moisture content changes of plus or minus 1% can be read directly from the meter 14 without adjustment of the attenuators. The recorder 15 can also be used to record moisture content changes of approximately plus or minus five percent (5%) without adjustment of the attenuator.

The sensing device 20 shown with in the dotted area of FIG. 1 may take many forms. A preferred embodiment for particulate solids or fluids is the horn and rectangular cell arrangement shown in FIG. 1 where sample quantities are to be measured. This form of the invention is shown in greater detail in FIGS. 2a and 2b. The rectangular cell 21 in which the material 5 is placed is made of material which is essentially transparent to microwave energy. An example of a good material for the rectangular cell is polystyrene because of its uniform electrical properties, low moisture absorption, and low cost. A side elevational view of the rectangular cell 21 is shown in FIG. 2a. The rectangular cell 21 is supported on the support 19 with the bottom of the cell resting on the support. The rectangular cell 21 has the internal dimensions depicted by the small letters $a$, $b$ and $c$. The internal width $a$, the internal depth $b$ (shown in FIG. 2b) and the internal height $c$ of the cell 21 are determined relative to the dimensions of the aperture of the horn antennas 4 and 6 and by the range of moisture content to be measured. The depth $b$ and height $c$ are made slightly larger than the respective horn aperture dimensions $e$ and $d$ for the antenna 6 as shown in FIGS. 2a and 2b, respectively. If the cross-section of the cell 21 is too small, it does not sufficiently intercept the microwave energy passing between the horns 4 and 6. On the other hand, if it is made too large, it becomes too awkward to handle and requires an objectionably large sample of test material, and becomes more expensive to fabricate. The internal width $a$ of the cell 21 is selected to result in a desired range of attenuation values for a particular range of moisture contents. Based on theory, the following relationship between cell width $a$ and moisture content has been derived.

| Percentage of moisture: | Cell width $a$ inches |
|---|---|
| 1 to 4% | 7 |
| 4 to 25% | 2½ |
| 25 to 100% | ¼ |

The wall thickness $f$ of the cell 21 is selected on the basis of strength and electrical requirements. It is desirable that the wall have an electrical thickness which is a multiple of a half wavelength in the dielectric. This minimizes reflections from the cell 21 when it is empty and the error which may be caused by small variations in cell wall thickness and dielectric constant. It also results in maximum sensitivity to moisture content changes in the material being measured. The cell 21 is approximately centered with respect to the axis of the horns 4 and 6 in order to insure maximum interception of the microwave beam.

For a particular combination of frequency, horn antennas, horn separation and cells there is an optimum position for the cell 21 along the axis of the horns in order to minimize measurement errors due to small displacements in the cell position. This is illustrated in FIG. 3, based on tests on rice, indicating an optimum position $g$ of 0.16 inch between the end of the horn 4 and the exterior wall of the cell 21. Although the curves of FIG. 3 indicate that high positional accuracy is required for the position or location of the cell 21, the transmitting horn 4 serves as an ideal means of accurately positioning the cell. The spacing between the transmitting horn 4 and the receiving horn 6 is kept to a minimum in order to insure maximum pickup of the energy transmitted through the cell.

An important aspect of the invention is the orientation of the material undergoing measurement relative to the direction of propagation of the energy therethrough, particularly with respect to solid materials. It has been found that the preferable mode of operation is to transmit the energy through the container in a horizontal sense rather than vertical. For this purpose, horizontal has reference to transmitting the energy through the side walls and the material rather than through an end, the material, and directly into the receiving anenna. This horizontal operation produces the best results when the side walls have a thickness on the order of a half-wave length (½λ) of the propagated energy. In the vertical arrangement, the depth of the material mus be closely controlled and it is difficult to obtain parallelism between the bottom and top walls. This precision is avoided in the horizontal arrangement since parallelism is insured by virtue of the container side walls.

A further feature of the rectangular cell 21 is the microwave absorber 22 shown in FIG. 2a mounted on the support 19 or integral therewith underneath the bottom of the cell to eliminate harmful effects of reflections from the surface of the support 19 on which the cell would otherwise rest. This is particularly desirable in the case of a metal surface on the support 19 which would reflect all of the energy incident upon it. The absorber 22 may be covered with a sheet of dielectric material to provide a firmer support for the cell and for protection to the absorber surface.

Now referring to FIG. 5, wherein a preferred embodiment of the sensing device suitable for the analysis of moisture in fluids over the range of about 1% to 100% is illustrated. The fluid to be analyzed passes through an adapter 31 which changes the cross-section of the fluid containing pipe from the conventional round configuration to a rectangular configuration. The fluid enters the waveguide cell section 32 through a grid of small holes 33 in the side wall of the waveguide cell. These holes 33 are made very small with respect to the wavelength of the microwave signal to minimize the leakage of signal into the fluid transition section 31 and also to minimize reflection of the microwave signal caused by disruption of the microwave wall currents. Typically these holes 33 have a diameter of 1/20 of a free space wavelength or less. In addition to preventing the leakage of microwave energy, these holes 33 also serve as a means of providing more uniform flow of the fluid across the cell 32. After passage through the cell 32 the fluid exits through a perforated wall 34 and adapter section 35 similar to that on the entrance side.

The microwave energy which is used to provide a continuous indication of moisture content of the fluid in the cell 32 enters the cell 32 through a waveguide section 36 and passes through a glass window 38 which is shown to be positioned in adapter 37 on the receiving side of the cell 32. The windows of which window 38 is representative are made of a low-loss material which also has good thermal properties so that the sensing device can be used with high temperature fluids. Such commercially available materials such as quartz, Pyrex and Vycor are suitable. The thickness of the window 38 in the direction of propagation of the microwave energy is made equal to ½ wavelength in the dielectric to provide minimum reflection of microwave energy when the cell 32 is empty and maximum sensitivity to changing moisture content of a fluid passing through the cell 32.

After passing through the adapter 37 and its associated window, the microwave energy propagates through the cell section 32 containing the fluid. Here it is attenuated with the signal attenuation being approximately linearly related to fluid moisture content. At the exit end of the cell 32 the attenuated microwave signal passes through window 38 in adapter 39 and waveguide 40 identical to that at the input side.

The sensing cell 32 is initially calibrated with a fluid of known moisture content and the calibration data is then used for determining the unknown moisture content of fluids. The attenuation is a function of the fluid temperature as well as the moisture content and this must be included in the initial calibration and subsequent measurements. The sensing device of FIG. 5 may be substituted for the sensing device in FIG. 1 and the auxiliary equipment thereof used in conjunction with this sensing device to provide a moisture measuring device for fluids.

Figure 6:
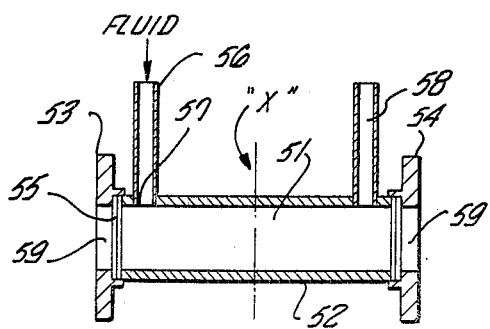
FIG. 6 is an alternative embodiment of a device for holding the substance under test in the moisture meter in accordance with the present invention.

A sensing device particularly adapted for very small concentrations of moisture in fluids having low losses at microwave frequencies is illustrated in FIG. 6. Examples of these types of fluids are kerosene, carbon tetrachloride, mineral oil, polybutane, and a variety of petroleums and petroleum derivatives. For these fluids it is possible to determine moisture contents in the extremely low range of several parts per million. To achieve this sensitivity, a larger interaction region between the microwave signal and the fluid is required. The length of this interaction region in the direction of microwave signal propagation is made equal to the length which will result in a substantial attenuation of the signal for the reference level condition. The reference level of the fluid is defined as the normal condition of the fluid from which changes in moisture content are to be determined.

The length of the interaction region should not be so long as to reduce the signal level below a value so that it is not readily detectable. However, the sensitivity to small changes in moisture content increases as the length of the cell and, thus, the interaction region increases so it is desirable to make the cell as long as possible providing that it does not exceed the length which would result in an inadequate signal level.

The sensing device shown in FIG. 6 has an interaction region 51 that is equal to the length of the metal tubing 52 whose dimensions are selected so that it forms a suitable waveguide transmission system at the microwave signal frequency. Desirably, the dimensions of the metal tubing 52 are made the same as those of one of the standard sizes of waveguide. The tubing 52 has a flange 53 at the input end and a flange 54 at the output end so that it may be coupled to a source of microwave signals and a microwave detector respectively, through an appropriate waveguide. A window 55 is placed between the input to the tubing 52 and the flange 53 to act as a seal for the fluid within the tubing 52 and at the same time to allow free propagation of the microwave signal into the tubing 52 and the fluid therein. The window 55 is made of material that is essentially transparent to the passage of microwave energy and has the physical properties referred to above to resist deforming due to fluid pressure and to tolerate the expected temperatures of the fluids to be analyzed. The thickness of the window 55 is not critical but is preferably as thin as possible consistent with maintaining the mechanical and thermal properties required.

The fluid to be analyzed enters the tubing 52 by means of an appropriate tube 56 which is located as close as possible to the window 55 to minimize dead flow spaces. The aperture 57 in the tubing 52 through which the fluid enters the tubing is positioned and sized to minimize disturbance of the microwave signal. A preferred position in rectangular waveguide tubing would be along the center line of the broad wall and a preferred diameter is ¼ or less of the inside width of the broad wall of the rectangular waveguide. If the hole is made too large, substantial microwave energy may pass into the fluid tube 56 where it may be affected by whatever couplings may be used and adversely affect the calibration of the system. If the hole is located off the center line of the broad wall of the waveguide it may cause spurious modes to be generated in the tubing containing the fluid which would adversely affect the calibration. The fluid and microwave energy both propagate along the tubing 52 and exit at the opposite end through tubing 58 and opening 59, respectively.

It is desirable in many applications to be able to readily change the length of the tubing 52 and, therefore, the interaction area to adapt it to various fluids or various reference level moisture conditions. Thus the tubing 52 may be made in two sections joined by an appropriate sealed flange at some convenient point along its length, such as the point "x." Various lengths of tubing identical to that used in tubing 52 may then be inserted to make the overall length the desired amount. For fluids having very minute moisture contents and very low losses, the total length of tubing required for high sensitivity may be thirty feet or more. Multiple sections may then be inserted to reach this length and parts may be used to adapt the tubing to a desired physical configuration.

Figure 7:
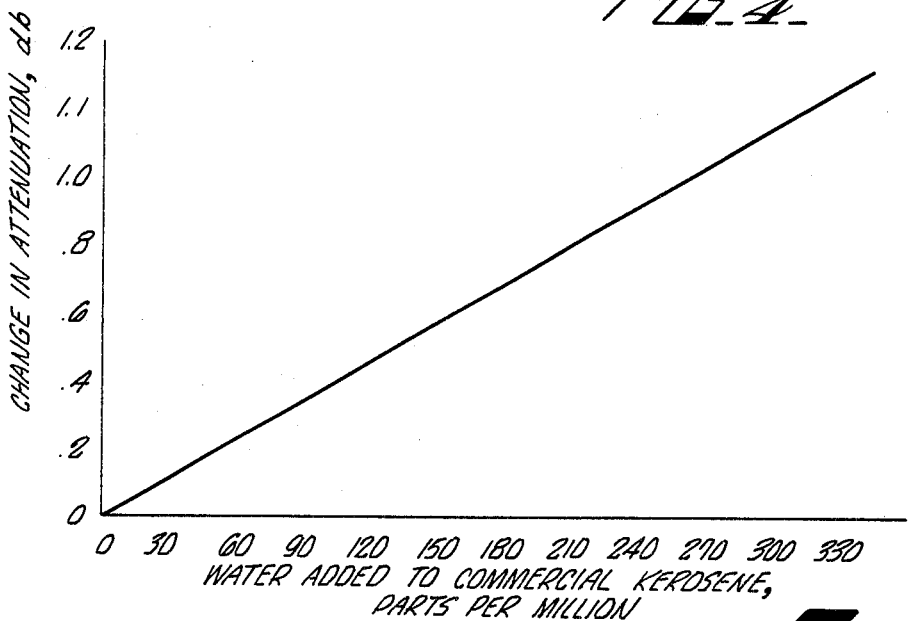
FIG. 7 is a graphical representation of a calibration curve of the cell of FIG. 6 illustrating the change in attenuation with the addition of water to kerosene.

The aforementioned cell is calibrated by passing fluids of known moisture content through the cell and establishing the attenuation v. moisture content relationship. A typical graphical representation of water added to commercial grade kerosene for this purpose is illustrated in FIG. 7.

What is claimed is:
1. Apparatus for determining the moisture content of materials, solids and liquids, and providing a direct indication of the moisture content of the material undergoing measurement comprising means for generating electromagnetic energy in a preselected frequency range, means for modulating the energy at an audio frequency, means for propagating the modulated energy in a preselected beam, means coupled between the generating means and the propagating means for isolating the generating means from reflected energy tending to change the frequency and/or amplitude of the generating means, a container of preselected electrical characteristics for holding the material undergoing measurement arranged in the path of the propagated energy, reeciving means arranged on the opposite side of the container from the propagating means for receiving the modulated energy transmitted therethrough and providing an output indication varying in accordance with the modulating frequency, a first variable step attenuating means coupled to be responsive to the output indication from said receiving means, first amplifying means coupled to said first attenuating means, a second variable step attenuating means coupled to said first amplifying means, second amplifying means, reference setting control means coupled between the second amplifying means and the second attenuating means, detecting means coupled to said second amplifying means for providing an output indication representative of the moisture content of the material undergoing measurement, said reference setting control means being coupled to control the signal level of said second amplifying means and said detecting means, and indicating means calibrated for indicating moisture content coupled to said detecting means for directly indicating the moisture content of the material undergoing measurement.

2. Apparatus for determining the moisture content of materials as defined in claim 6 wherein said container comprises conduit means for conveying a fluid undergoing measurement in a preselected pattern compatible with the means for propagating the energy, said means including a waveguide section having opposed walls perforated with very small apertures relative to the wavelength of the propagated energy for conveying the fluid therethrough and thereby through the energy propagating therein, said waveguide section being further defined with means for containing the fluid therein and yet transmitting the energy therethrough.

3. Apparatus as defined in claim 2 wherein said small apertures are on the order of $\frac{1}{20}$ or less of a free space wavelength of the propagated energy.

4. Apparatus for determining moisture content as defined in claim 6 wherein the container is constructed of upstanding side walls having a thickness of one-half of the wavelength of the propagated energy in the side wall with the energy being propagated through a side wall, the material contained therein and the other side wall to said receiving means.

References Cited

UNITED STATES PATENTS

| | | | |
|---|---|---|---|
| 2,630,472 | 3/1953 | McArthur | 324—58.5 |
| 2,659,860 | 11/1953 | Breazeale | 324—58.5 |
| 2,703,079 | 3/1955 | Argento | 324—58.5 XR |
| 2,792,548 | 5/1957 | Hershberger | 324—58.5 |
| 3,025,463 | 3/1962 | Luoma et al. | 324—58.5 |
| 3,323,044 | 5/1967 | Parlanti et al. | 324—58.5 |
| 3,360,721 | 12/1967 | Pullman | 324—58.5 |

RUDOLPH V. ROLINEC, Primary Examiner

P. F. WILLE, Assistant Examiner